United States Patent [19]
Melamed et al.

[11] 4,081,761
[45] Mar. 28, 1978

[54] ENHANCED LASER PUMPING BY AUXILIARY LUMINESCENT CENTERS THAT ABSORB AND TRANSFER NORMALLY WASTED PUMP ENERGY TO THE LASER ION

[75] Inventors: Nathan T. Melamed, Pittsburgh; Chikara Hirayama, Murrysville, both of Pa.

[73] Assignee: Westinghouse Electric Corporation, Pittsburgh, Pa.

[21] Appl. No.: 852,966

[22] Filed: Aug. 11, 1969

[51] Int. Cl.² ............................................. H01S 3/17
[52] U.S. Cl. .......................... 331/94.5 E; 106/47 Q; 252/301.1 L
[58] Field of Search .................. 331/94.5; 252/301.2, 252/301.1 L; 106/47, 52, 53, 54

[56] References Cited

U.S. PATENT DOCUMENTS

| 3,079,347 | 2/1963 | Garrett et al. | 331/94.5 |
| 3,174,938 | 3/1965 | Soden et al. | 331/94.5 |
| 3,417,345 | 12/1968 | Cabezas et al. | 331/94.5 |
| 3,729,690 | 4/1973 | Snitzer | 331/94.5 E |

FOREIGN PATENT DOCUMENTS 1,015,057  12/1965  United Kingdom ................ 331/94.5

OTHER PUBLICATIONS

Snitzer, Optical Maser Action of $Nd^{+3}$ in a Barium Crown Glass. Phys. Rev. Letters, vol. 7, No. 12, (Dec. 15, 1961), pp. 444–446.

Gandy, et al., Radiationless Resonance Energy Transfer from $UO_2^{2+}$ to $Nd^{3+}$ in Coactivated Barium Crown Glass. Appl. Phys. Letters, vol. 4, No. 11, (June 1, 1964), pp. 188–190.

Primary Examiner—William L. Sikes
Attorney, Agent, or Firm—Alex Mich, Jr.

[57] ABSTRACT

Sensitizer impurities absorb a portion of pump radiation in a laser generator that is not absorbed by the activator impurity. The sensitizer transfers the otherwise wasted radiation to the activator impurity. $Mn^{+2}$, $UO_2^{+2}$ and $Ce^{+3}$ are examples of sensitizer ions. The foregoing sensitizer ions may, in turn, be sensitized by other impurities, known as cosensitizers to further utilize pump radiation.

10 Claims, 4 Drawing Figures

SPECTRAL DISTRIBUTION OF THE ABSORPTION AND EMISSION BANDS OF Mn AND OF Nd IN A PHOSPHATE GLASS.

SPECTRAL DISTRIBUTION OF THE ABSORPTION AND EMISSION BANDS OF Mn AND OF Nd IN A PHOSPHATE GLASS.

ENHANCED LASER PUMPING BY AUXILIARY LUMINESCENT CENTERS THAT ABSORB AND TRANSFER NORMALLY WASTED PUMP ENERGY TO THE LASER ION

This invention relates generally to optical masers or lasers and more specifically to optical masers having an improved pump utilization efficiency.

Present day lasers are severely limited by low efficiencies in the utilization of pump radiation. Optical pumps, as for example xenon flash lamps, emit or radiate light energy over a relatively broad spectral region. The impurities or activators responsible for laser action, particularly the rare earth ions, have a comparatively narrow absorption band and have heretofore utilized only a small fraction of the pump radiation. The low efficiency of pump radiation utilization necessitates large power supplies for flash lamps in order to achieve even pulsed outputs from lasers. For continuous laser operation even more severe demands are created for high energy outputs from the pump source. The poor utilization of pump radiation not only limits the number of lasers which may be continuously operated but also often requires operation at liquid nitrogen or helium temperature to obtain the continuous laser action. Broadening the spectral region of pump radiation which is utilized in the laser action would be a significant advantage in the art. An improved utilization of the broad spectrum of radiation could lead to the use of pump sources presently unsuitable for pumping. Laser impurities or activators which have threshold levels that cannot be met by present pump sources could be provided with sufficient pump energy to attain laser action. Lasers which are presently capable of producing only pulsed outputs could provide continuous outputs with higher pump radiation utilization and lasers which must now employ very low temperatures for continuous action could be operated continuously nearer to room temperature. The improved efficiency of the pump utilization is, of course, in itself advantageous and desirable.

Accordingly, it is the primary object of this invention to provide for an improved utilization of pump radiation.

It is an object of this invention to provide laser systems or generators which have significantly improved efficiencies.

An object of this invention is to provide materials and means for utilizing heretofore unused bands of pump radiation for laser action.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

In accordance with our discoveries, the foregoing and other objects are achieved in a manner which may be generally described as sensitization. As noted heretofore, the activator or laser ions absorb only a portion or small band of the available energy radiated from the optical pump source and a much larger portion or band of the radiated energy is wasted. We have found that the normally wasted energy can be transferred to the activator or laser ions by an auxiliary luminescent center. More specifically, we employ sensitizers or auxiliary impurity centers, other than the activator or laser ions, to absorb energy in a region of the pump band not being absorbed by the laser ion and to transfer that additional absorbed energy to the activator impurity. To accomplish this, the spectral characteristics of the sensitizer impurity and the activator impurity must be appropriately related, as outlined hereinafter.

There must be an overlap between the sensitizer emission spectrum (whether observed or not) and the activator absorption band. The sensitizer must absorb in a spectral region where the activator does not absorb, within, of course, the region of pump radiation, and there should be little or no interfering absorption between the sensitizer and activator. The sensitizer should preferably have a short radiative lifetime.

The particular choice of a sensitizer is determined by the activator impurity to be employed. We have found, for example, that the $Mn^{+2}$ and $UO_2^{+2}$ ions are sensitizers for the laser or activator ions $Nd^{+3}$, $Ho^{+3}$, $Eu^{+3}$, $Pr^{+3}$, $Sm^{+3}$, $Tb^{+3}$, $Dy^{+3}$, $Yb^{+3}$ and $Er^{+3}$, while the $Ce^{+3}$ ion is a sensitizer for the activators $Eu^{+3}$, $Tb^{+3}$, $Nd^{+3}$, $Sm^{+3}$, $Gd^{+3}$, $Dy^{+3}$, $Ho^{+3}$, $Er^{+3}$, $Tm^{+3}$ and $Yb^{+3}$. The designated or matched sensitizer-activator pairs have appropriately related spectral characteristics. The sensitizer impurities will absorb a portion of optical pump radiation heretofore wasted and will transfer the portion to either of its paired activator impurities.

Figure 1:
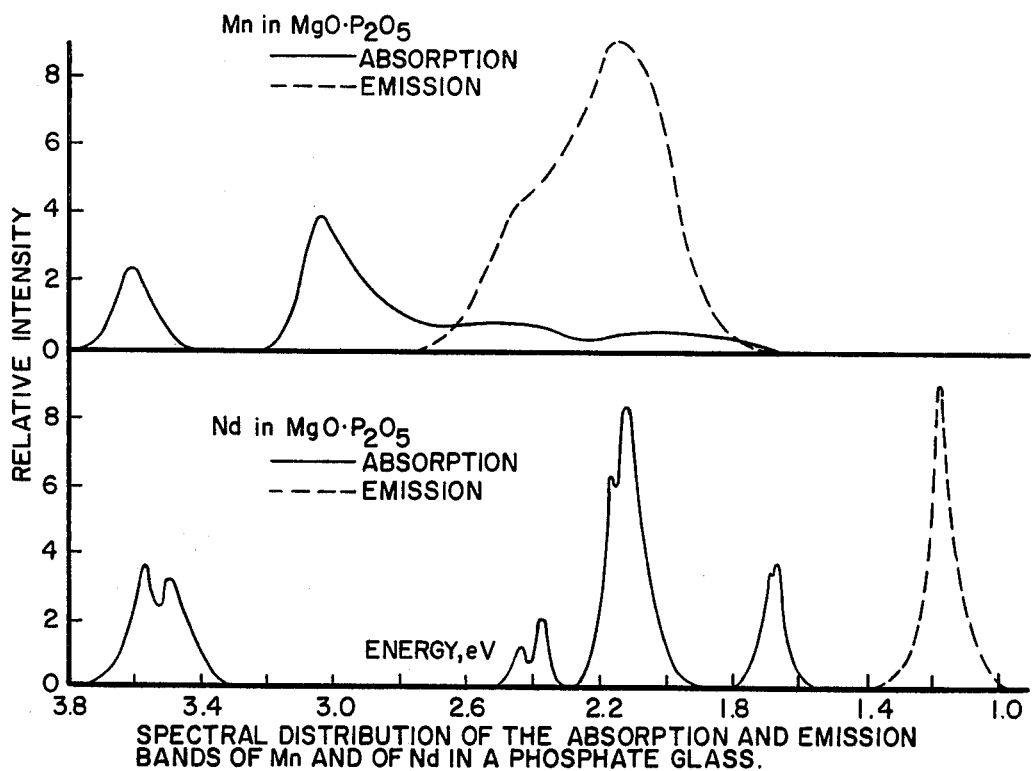
FIG. 1 is a graphic illustration of $Mn^{+2}$ and $Nd^{+3}$ emission and absorption spectra.

Referring now to FIG. 1 in the way of a specific example, we have graphically illustrated the emission and absorption bands of a phosphate glass $(MgO \cdot P_2O_5)$ containing the sensitizer $Mn^{+2}$ and the same glass containing the activator $Nd^{+3}$. It is apparent from FIG. 1 that $Mn^{+2}$ absorbs in a region where the $Nd^{+3}$ does not absorb and that $Mn^{+2}$ emits in a region where the $Nd^{+3}$ absorbs. The absorption of $Mn^{+2}$ in the 2.0 to 2.2 eV region, a region where the $Nd^{+3}$ absorbs only a minor interference. The $Mn^{+2} - Nd^{+3}$ pair has exhibited a utilization of pump radiation heretofore wasted by laser rods containing only the activator $Nd^{+3}$ in actual tests.

Figure 2:
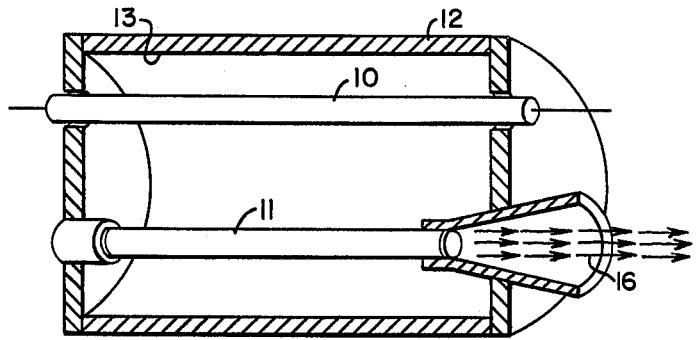
FIG. 2 is a partially sectioned elevation of an optical maser generator.
Figure 3:
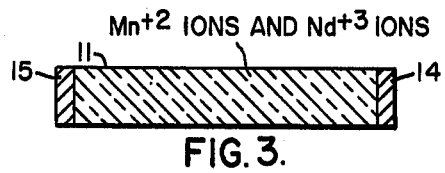
FIG. 3 is a cross-sectional detailed view of a laser rod which, in accordance with this invention, may contain an activator, sensitizer and cosensitizer.

Referring now to FIG. 2, we have illustrated an laser generator, generally known in the art. An optical pump 10, which may be a xenon flashtube, and a laser rod 11 are arranged within an elliptical cylinder housing 12 and located at the respective axes of the cylinder. The inside surface 13 of the housing is a highly polished reflector. The laser rod 11, illustrated in detail in FIG. 3 has reflecting mirrors 14, 15 at its ends, forming a resonator or cavity therebetween, the mirror 14 being highly reflecting and the mirror 15 being highly reflecting and partially transmitting. The laser rod 11 is made from an optical quality silicate glass having a base composition of 35 $NK_2O \cdot 0.65\ SiO_2$, or a barium crown glass containing about 4 percent, by weight of $Nd_2O_3$ and about 4 percent, by weight of $Mn^{+2}$.

In operation, the flashtube 10 is pulsed to produce a surge of pumping radiation which is directed to the laser rod. The $Nd^{+3}$ ions in the rod directly absorb a first narrow band of the broad pump radiation and the $Mn^{+2}$ ions in the rod absorb another or second band of the broad pump radiation. The second band of absorbed radiation is transferred by the $Mn^{+2}$ ions to the $Nd^{+3}$ ions. Both the energy directly absorbed by the $Nd^{+3}$ ions and that transferred from the $Mn^{+2}$ ions contributes to the necessary pumping to create a population inversion and the laser action. The stimulated emission of radiation is amplified in the cavity and is emitted as the coherent beam 16 of FIG. 2.

Figure 4:
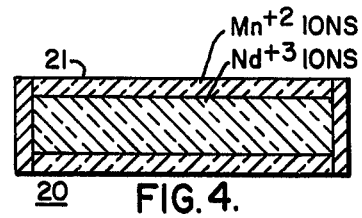
FIG. 4 is a cross-sectional detailed view of a glass clad laser rod in accordance with this invention.

Although it is preferred to employ the sensitizer impurity directly in the host, together with the activator impurity for a more efficient energy transfer, it is nonetheless possible to derive some increase in utilization of the pump radiation by, as illustrated in FIG. 4, cladding the glass laser rod 20, which contains the $Nd^{+3}$ ions, with a glass 21 containing the sensitizer impurity. In the case of liquid lasers, for example, the containing envelope could include the sensitizer.

It should be understood that the sensitizer must be present as the ion, in the indicated valence state, to effect the desired absorption and transfer of energy. Any amount of the $Mn^{+2}$ ion should, theoretically, produce some of the desired absorption and transfer but at least about 0.5%, by weight, of the glass host is considered an effective amount and from about 5 to 9 percent is preferred. The $Mn^{+2}$ ion may be introduced in the form of its carbonate or acetate together with the usual oxides in the smelt mixture of the glass. Moreover, the sensitizer will be effective in any glass host suitable for the laser action of the rare earth activator ions.

About 0.1 percent, by weight, of glass, is an effective amount of $UO_2^{+2}$ for sensitizing $Nd^{+3}$ and $Ho^{+3}$, up to about 6 percent may be included and about 2 to 3 percent, by weight of glass host is preferred. About 0.5 percent, by weight of glass, is an effective amount of $Ce^{+3}$ for sensitizing $Eu^{+3}$ and $Tb^{+3}$ and about 5 to 9 percent is preferred. It should be understood that each of these sensitizers will theoretically produce some improvement in utilizing pump radiation by transferring unused energy to the activator. These sensitizers may also be used in any glass host suitable for the laser action of the rare earth activator ion. $UO_2^{+2}$ may be introduced into the glass melt mixture as uranyl nitrate, $(UO_2)(NO_3)_2$ and $Ce^{+3}$ may be introduced in the form of its sulfate or chloride.

In accordance with principles known in the art, the rare earth activator ions are added to the glass host in amounts up to about 8 percent, by weight, as the oxide, e.g. $Nd_2O_3$, $Yb_2O_3$, $Eu_2O_3$ and $Tb_2O_3$. The principle of sensitizer absorption and transfer of that absorbed energy is not dependent on the presence of any specific amount of activator in the host. It should be emphasized that much smaller amounts than 8 percent of the rare earth oxide will be sufficient to produce laser action and that it is the rare earth ion which has the ability to function as a laser.

In accordance with another aspect of the invention, it has been found that three of the foregoing sensitizers, i.e. $Mn^{+2}$, $UO_2^{+2}$ and $Ce^{+3}$ may in turn be sensitized by other impurities, known hereinafter as cosensitizers, to even further improve the utilization of the broad band of pump radiation. The relationship of the spectral characteristics of the cosensitizer and sensitizer is required to be the same as the relationship of spectra of sensitizer and activator. A summary of examples of suitable combinations is given in Table I, hereinbelow.

TABLE I

| Activator | Sensitizer | Cosensitizer |
|---|---|---|
| $Nd^{+3}$ | $Mn^{+2}$ | $As^{+3}, Sb^{+3}, Ce^{+3}, Sn^{+3}, Pb^{+2}$ |
| $Pr^{+3}$ | $Mn^{+2}$ | $As^{+3}, Sb^{+3}, Ce^{+3}, Sn^{+3}, Pb^{+2}$ |
| $Sm^{+3}$ | $Mn^{+2}$ | $As^{+3}, Sb^{+3}, Ce^{+3}, Sn^{+3}, Pb^{+2}$ |
| $Eu^{+3}$ | $Mn^{+2}$ | $As^{+3}, Sb^{+3}, Ce^{+3}, Sn^{+3}, Pb^{+2}$ |
| $Ho^{+3}$ | $Mn^{+2}$ | $As^{+3}, Sb^{+3}, Ce^{+3}, Sn^{+3}, Pb^{+2}$ |
| $Er^{+3}$ | $Mn^{+3}$ | $As^{+3}, Sb^{+3}, Ce^{+3}, Sn^{+3}, Pb^{+2}$ |
| $Yb^{+3}$ | $Mn^{+2}$ | $As^{+3}, Sb^{+3}, Ce^{+3}, Sn^{+3}, Pb^{+2}$ |
| $Tb^{+3}$ | $UO_2^{+2}$ | $As^{+3}, Sb^{+3}, Ce^{+3}, Sn^{+3}, Pb^{+2}$ |
| $Dy^{+3}$ | $UO_2^{+2}$ | $As^{+3}, Sb^{+3}, Ce^{+3}, Sn^{+3}, Pb^{+2}$ |
| $Tm^{+3}$ | $UO_2^{+2}$ | $As^{+3}, Sb^{+3}, Ce^{+3}, Sn^{+3}, Pb^{+2}$ |
| $Nd^{+3}$ | $UO_2^{+2}$ | $As^{+3}, Sb^{+3}, Ce^{+3}, Sn^{+3}, Pb^{+2}$ |
| $Pr^{+3}$ | $UO_2^{+2}$ | $As^{+3}, Sb^{+3}, Ce^{+3}, Sn^{+3}, Pb^{+2}$ |
| $Sm^{+3}$ | $UO_2^{+2}$ | $As^{+3}, Sb^{+3}, Ce^{+3}, Sn^{+3}, Pb^{+2}$ |
| $Eu^{+3}$ | $UO_2^{+2}$ | $As^{+3}, Sb^{+3}, Ce^{+3}, Sn^{+3}, Pb^{+2}$ |
| $Ho^{+3}$ | $UO_2^{+2}$ | $As^{+3}, Sb^{+3}, Ce^{+3}, Sn^{+3}, Pb^{+2}$ |
| $Er^{+3}$ | $UO_2^{+2}$ | $As^{+3}, Sb^{+3}, Ce^{+3}, Sn^{+3}, Pb^{+2}$ |
| $Yb^{+3}$ | $UO_2^{+2}$ | $As^{+3}, Sb^{+3}, Ce^{+3}, Sn^{+3}, Pb^{+2}$ |
| $Pr^{+3}$ | $Ce^{+3}$ | $Pb^{+2}, Bi^{+3}$ |
| $Nd^{+3}$ | $Ce^{+3}$ | $Pb^{+2}, Bi^{+3}$ |
| $Sm^{+3}$ | $Ce^{+3}$ | $Pb^{+2}, Bi^{+3}$ |
| $Eu^{+3}$ | $Ce^{+3}$ | $Pb^{+2}, Bi^{+3}$ |
| $Gd^{+3}$ | $Ce^{+3}$ | $Pb^{+2}, Bi^{+3}$ |
| $Tb^{+3}$ | $Ce^{+3}$ | $Pb^{+2}, Bi^{+3}$ |
| $Dy^{+3}$ | $Ce^{+3}$ | $Pb^{+2}, Bi^{+3}$ |
| $Ho^{+3}$ | $Ce^{+3}$ | $Pb^{+2}, Bi^{+3}$ |
| $Er^{+3}$ | $Ce^{+3}$ | $Pb^{+2}, Bi^{+3}$ |
| $Tm^{+3}$ | $Ce^{+3}$ | $Pb^{+2}, Bi^{+3}$ |
| $Yb^{+3}$ | $Ce^{+3}$ | $Pb^{+2}, Bi^{+3}$ |

The cosensitizer will absorb energy in a spectral region where neither the activator nor sensitizer absorb and there should be little or no interfering absorption between the cosensitizer and either the sensitizer or activator. Whether observed or not, there must be an overlap between the cosensitizer emission spectrum and the sensitizer absorption band. Again, there is no criticality as to concentration of cosensitizer so long as it is present as the ion and in the indicated valence state, although a concentration from 0.5 to 8 percent by weight is preferred. The cosensitizer is preferably included in the glass host laser rod together with the sensitizer and activator but it may also be included in a glass cladding coating, similar to that illustrated in FIG. 4.

We claim as our invention:

1. A laser medium comprising a host, a $Nd^{+3}$ activator ion capable of laser action in the host and a sensitizer ion in said medium capable of absorbing and transferring energy to the activator ion, the sensitizer selected from the group of ions consisting of $Mn^{+2}$ and $UO_2^{+2}$.

2. The laser medium of claim 1 wherein the sensitizer is selected from the group consisting of $Mn^{+2}$ and $UO_2^{+2}$ and the medium contains a cosensitizer ion selected from the group consisting of $As^{+3}$, $Sb^{+3}$, $Ce^{+3}$, $Sn^{+3}$ and $Pb^{+2}$.

3. The laser medium of claim 2 wherein the sensitizer is $UO_2^{+2}$.

4. A glass host laser rod containing $Nd^{+3}$ activator impurity ions capable of laser action in said host and sensitizer impurity ions capable of transferring energy to the activator impurity ions, the sensitizer impurity ions selected from the group of ions consisting of $Mn^{+2}$ and $UO_2^{+2}$.

5. The laser rod of claim 4 wherein the glass host is selected from the group consisting of, silicate and barium crown glasses.

6. The laser rod of claim 4 wherein the glass host is a potassium silicate glass.

7. The laser rod of claim 4 wherein the sensitizer impurity ions are $Mn^{+2}$ in an amount from about 0.5 to 9 percent by weight of the glass host.

8. The laser rod of claim 4 wherein the sensitizer impurity ions are $UO_2^{+2}$ in an amount from about 0.1 to 6 percent by weight of the glass host.

9. The laser rod of claim 4 wherein the host also contains cosensitizer impurity ions selected from the group consisting of $As^{+3}$, $Sb^{+3}$, $Ce^{+3}$, $Sn^{+3}$ and $Pb^{+2}$.

10. In a laser generator comprising a resonant cavity, means for extracting coherent radiation from the cavity, an activator impurity ion within said cavity, the activator being capable of producing a stimulated emission of radiation in response to an absorption of a first relatively narrow band of radiation from a relatively broad band of radiation including said narrow band, the improvement comprising sensitizing ion means within said generator adapted to absorb a portion of the radiation in a second band not substantially within said first band and to transfer an absorbed portion to the activator impurity, the spectral characteristics of the activator ion impurity ion and sensitizing ion means providing an overlap between the sensitizer emission spectrum and the activator absorption band with essentially no interfering absorption between said ions, and further including cosensitizing ion means to absorb another portion of radiation in a third band not substantially within said first and second bands and to transfer the other portion to said ion means absorbing in the second band, the spectral characteristics of the cosensitizing ions means and sensitizing ion means providing an overlap between the cosensitizing ion means emission spectrum and sensitizing ion means absorption band, whereby a greater portion of the radiation may be utilized by the activator impurity.

* * * * *